United States Patent
Guan

(10) Patent No.: US 9,057,932 B2
(45) Date of Patent: Jun. 16, 2015

(54) IMAGING APPARATUS, IMAGE PROCESSING METHOD, AND RECORDING MEDIUM FOR RECORDING PROGRAM THEREON

(75) Inventor: Haike Guan, Yokohama (JP)

(73) Assignee: RICOH COMPANY, LTD., Tokyo (JP)

( * ) Notice: Subject to any disclaimer, the term of this patent is extended or adjusted under 35 U.S.C. 154(b) by 428 days.

(21) Appl. No.: 13/697,923

(22) PCT Filed: May 12, 2011

(86) PCT No.: PCT/JP2011/061466
§ 371 (c)(1),
(2), (4) Date: Nov. 14, 2012

(87) PCT Pub. No.: WO2011/142480
PCT Pub. Date: Nov. 17, 2011

(65) Prior Publication Data
US 2013/0063605 A1    Mar. 14, 2013

(30) Foreign Application Priority Data
May 14, 2010    (JP) .................................. 2010-111748

(51) Int. Cl.
*H04N 5/225*    (2006.01)
*G03B 17/38*    (2006.01)

(52) U.S. Cl.
CPC ...................... *G03B 17/38* (2013.01)

(58) Field of Classification Search
USPC ......... 348/169, 137, 141, 142, 148, 174, 180, 348/184, 199, 97, 64, 54, 50, 49, 25, 207.1, 348/207.99, 208.3, 208.4, 208.12, 208.14, 348/211.9, 211.13, 231.5, 231.99, 260, 262, 348/333.01, 333.02, 341, 345, 719, 756; 702/149, 142, 127, 96, 95; 382/103, 382/294
See application file for complete search history.

(56) References Cited

U.S. PATENT DOCUMENTS 6,323,898 B1    11/2001    Koyanagi et al.
7,907,176 B2 *    3/2011    Hayashi .................... 348/208.7
(Continued)

FOREIGN PATENT DOCUMENTS

JP    2006-229322    8/2006
JP    2007-74143 A    3/2007
(Continued)

OTHER PUBLICATIONS

Extended European Search Report issued Sep. 20, 2013 in Patent Application No. 11780733.9.
(Continued)

*Primary Examiner* — Jeffrey Harold
*Assistant Examiner* — Mustafizur Rahman
(74) *Attorney, Agent, or Firm* — Oblon, McClelland, Maier & Neustadt, L.L.P.

(57) ABSTRACT

An imaging apparatus includes: a setting processor which sets an image area including a tracking shooting object image in a pan-blur shooting as a tracking object image as a tracking image area, with respect to a specific frame image; a searching processor, by respectively setting a scanning area for a plurality of frame images following the frame image used to set the tracking image area, and respectively moving the scanning area on each corresponding frame image of the frame images, and makes a comparison of a characteristic amount of an image between the tracking image area and the scanning area, which respectively obtains a scanning area where the characteristic amount of the image is similar to the image in the tracking image area as a tracking object existing area including the tracking object image, with respect to the frame images; a measuring processor, by dividing a difference between a coordinate of the tracking object existing area obtained with respect to one frame image of the frame images and that obtained with respect to a next one by a certain time interval, which measures a moving speed of the tracking object image on a monitor screen; and a displaying processor which displays a speed display mark corresponding to the moving speed of the tracking object image on the monitor screen.

12 Claims, 7 Drawing Sheets

(56) References Cited

U.S. PATENT DOCUMENTS

| | | | |
|---|---|---|---|
| 2003/0026607 A1* | 2/2003 | Okisu et al. | 396/213 |
| 2004/0102864 A1* | 5/2004 | Stack et al. | 700/110 |
| 2005/0270408 A1* | 12/2005 | Kwon et al. | 348/345 |
| 2006/0251409 A1 | 11/2006 | Tabuchi et al. | |
| 2006/0255986 A1 | 11/2006 | Takanezawa et al. | |
| 2007/0257990 A1* | 11/2007 | Hayashi | 348/211.99 |
| 2008/0292214 A1* | 11/2008 | Vomweg et al. | 382/294 |
| 2009/0021695 A1* | 1/2009 | Scarpino | 351/210 |
| 2009/0110372 A1* | 4/2009 | Morioka et al. | 386/117 |
| 2009/0135261 A1 | 5/2009 | Imamura et al. | |
| 2009/0268074 A1 | 10/2009 | Sugino | |
| 2011/0122264 A1 | 5/2011 | Yamanaka et al. | |

FOREIGN PATENT DOCUMENTS

| | | |
|---|---|---|
| JP | 2009-100454 | 5/2009 |
| JP | 2009-130628 A | 6/2009 |
| JP | 2009-218719 | 9/2009 |
| JP | 2009-302794 A | 12/2009 |
| JP | 2010-41299 A | 2/2010 |
| JP | 2011-193443 | 9/2011 |
| WO | WO 2011/102495 A1 | 8/2011 |

OTHER PUBLICATIONS

Japanese Office Action issued Oct. 8, 2013, in Japan Patent Application No. 2010-111748.

International Search Report issued Aug. 23, 2011 in PCT/JP2011/061466 filed May 12, 2011.

* cited by examiner

IMAGING APPARATUS, IMAGE PROCESSING METHOD, AND RECORDING MEDIUM FOR RECORDING PROGRAM THEREON

TECHNICAL FIELD

The present invention relates to an imaging apparatus that is capable of shooting while tracking a moving photographic subject (so-called pan-blur shooting), an image processing method, and a recording medium for recording a program thereon.

BACKGROUND ART

In a case of shooting while tracking a moving photographic subject, as methods of controlling a direction of an imaging apparatus so as not to lose the photographic subject from a monitor screen of the imaging apparatus, a method of controlling the direction of the imaging apparatus such that a shooting area in the foreground in a moving direction of a photographic subject becomes larger than a shooting area in the background in the moving direction of the photographic subject (see Japanese patent application publication number 2006-229322), and a method of controlling the direction of the imaging apparatus such that a photographic subject does not disappear from the monitor screen while tracking the photographic subject (see Japanese patent application publication number As for a pan-blur shooting, as schematically illustrated in FIG. 1, in a case of shooting a photographic subject which is moving at high speed, when shooting is performed while an imaging apparatus (camera) tracks in a moving direction (for example, a direction of an arrow A) of the moving photographic subject at the same speed as a moving speed of an image O of the moving photographic subject on a monitor screen G, the moving photographic subject is shot clearly, and an image T of a photographic subject that is a still object existing in a background is flowing (streaked), so that the background is blurred. In an image taken by the pan-blur shooting, a high-speed movement of the photographic subject is further emphatically expressed.

However, in the pan-blur shooting, it is necessary to have a high skill in order to correspond a tracking speed of a camera to a moving speed of a photographic subject, and it is difficult for general users to perform such a shooting, and therefore there are many cases of failure by the users in the pan-blur shooting.

Japanese patent application publication numbers 2006-229322 and 2009-100454 have proposed methods of controlling the direction of the imaging apparatus such that the photographic subject does not disappear from the monitor screen G while tracking the photographic subject. However, even if the photographic subject does not disappear from the monitor screen G, if there is a difference of speed between a moving speed of the photographic subject on the screen and a tracking speed of a camera, there is a problem such that the image O of the photographic subject on the monitor screen G relatively moves in the case of the pan-blur shooting, and the image O of the photographic subject is blurred, and therefore a suitable pan-blur shot image is not obtained.

SUMMARY OF THE INVENTION

An objective of the present invention is to provide an imaging apparatus capable of obtaining a suitable pan-blur shot image when a pan-blur shooting is performed while tracking a moving photographic subject, an image processing method, and a recording medium for recording a program thereon.

In order to achieve the above objective, an embodiment of the present invention provides: an imaging apparatus comprising: a setting processor which sets an image area including a tracking shooting object image in a pan-blur shooting as a tracking object image as a tracking image area, with respect to a specific frame image obtained at a certain time interval via a shooting optical system and consecutively displayed on a monitor screen; a searching processor which respectively sets a scanning area to compare with the tracking image area for a plurality of frame images following the frame image used to set the tracking image area, and respectively moves the scanning area on each corresponding frame image of the plurality of frame images, and makes a comparison of a characteristic amount of an image between the tracking image area and the scanning area, so that the searching processor respectively obtains a scanning area where the characteristic amount of the image is similar to the image in the tracking image area as a tracking object existing area including the tracking object image, with respect to the plurality of frame images; a measuring processor which divides a difference between a coordinate of the tracking object existing area obtained with respect to one frame image of the plurality of frame images and that obtained with respect to a next frame image to the one frame image by the certain time interval, so that the measuring processor measures a moving speed of the tracking object image on the monitor screen; and a displaying processor which displays a speed display mark corresponding to the moving speed of the tracking object image on the monitor screen.

In order to achieve the above objective, an embodiment of the present invention provides: an image processing method comprising: a setting processing step which sets an image area including a tracking shooting object image in a pan-blur shooting as a tracking object image as a tracking image area, with respect to a specific frame image obtained at a certain time interval via a shooting optical system and consecutively displayed on a monitor screen; a searching processing step which respectively sets a scanning area to compare with the tracking image area for a plurality of frame images following the frame image used to set the tracking image area, and respectively moves the scanning area on each corresponding frame image of the plurality of frame images, and makes a comparison of a characteristic amount of an image between the tracking image area and the scanning area, so that the searching processing step respectively obtains a scanning area where the characteristic amount of the image is similar to the image in the tracking image area as a tracking object existing area including the tracking object image, with respect to the plurality of frame images; a measuring processing step which divides a difference between a coordinate of the tracking object existing area obtained with respect to one frame image of the plurality of frame images and that obtained with respect to a next frame image to the one frame image by the certain time interval, so that the measuring processing step measures a moving speed of the tracking object image on the monitor screen; and a displaying processing step which displays a speed display mark corresponding to the moving speed of the tracking object image on the monitor screen.

In order to achieve the above objective, an embodiment of the present invention provides: a computer-readable recording medium for recording thereon a computer program capable of being executed comprising: a setting processing step which sets an image area including a tracking shooting object image in a pan-blur shooting as a tracking object image as a tracking image area, with respect to a specific frame image obtained at a certain time interval via a shooting optical system and consecutively displayed on a monitor screen; a searching processing step which respectively sets a scanning area to compare with the tracking image area for a plurality of frame images following the frame image used to set the tracking image area, and respectively moves the scanning area on each corresponding frame image of the plurality of frame images, and makes a comparison of a characteristic amount of an image between the tracking image area and the scanning area, so that the searching processing step respectively obtains a scanning area where the characteristic amount of the image is similar to the image in the tracking image area as a tracking object existing area including the tracking object image, with respect to the plurality of frame images; a measuring processing step which divides a difference between a coordinate of the tracking object existing area obtained with respect to one frame image of the plurality of frame images and that obtained with respect to a next one to the one frame image by the certain time interval, so that the measuring processing step measures a moving speed of the tracking object image on the monitor screen; and a displaying processing step which displays a speed display mark corresponding to the moving speed of the tracking object image on the monitor screen.

BRIEF DESCRIPTION OF THE DRAWINGS

FIG. 6A is a frame image where the tracking image area has been set, and FIG. 6B is a frame image illustrating a state where the tracking object existing area is being searched by using the scanning area.

DESCRIPTION OF THE EMBODIMENT

Hereinafter, an imaging apparatus according to an embodiment of the present invention will be explained with reference to the drawings.

Firstly, image processing of the imaging apparatus to which the present invention is applied will be explained with reference to FIGS. 2 and 3.

Figure 1:
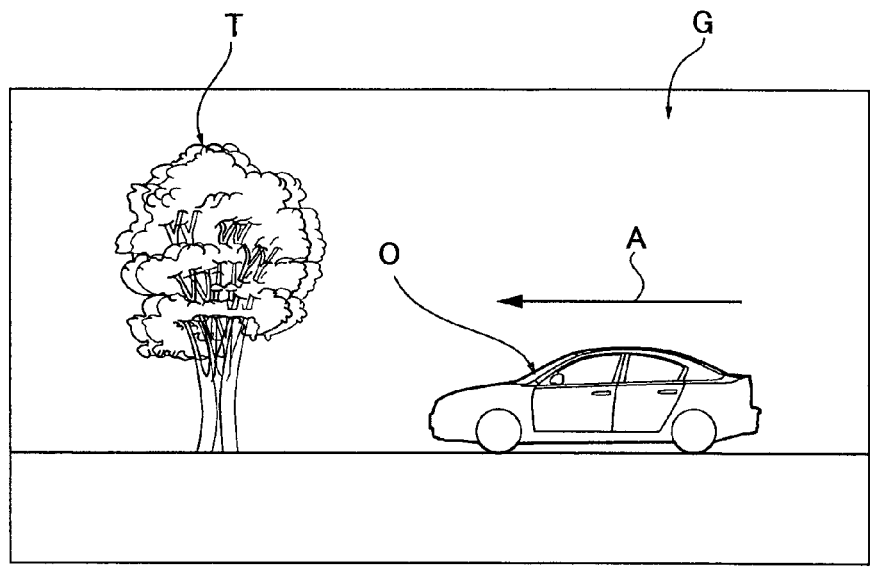
FIG. 1 is an explanatory diagram schematically illustrating an example of a case of performing a pan-blur shooting.
Figure 2:
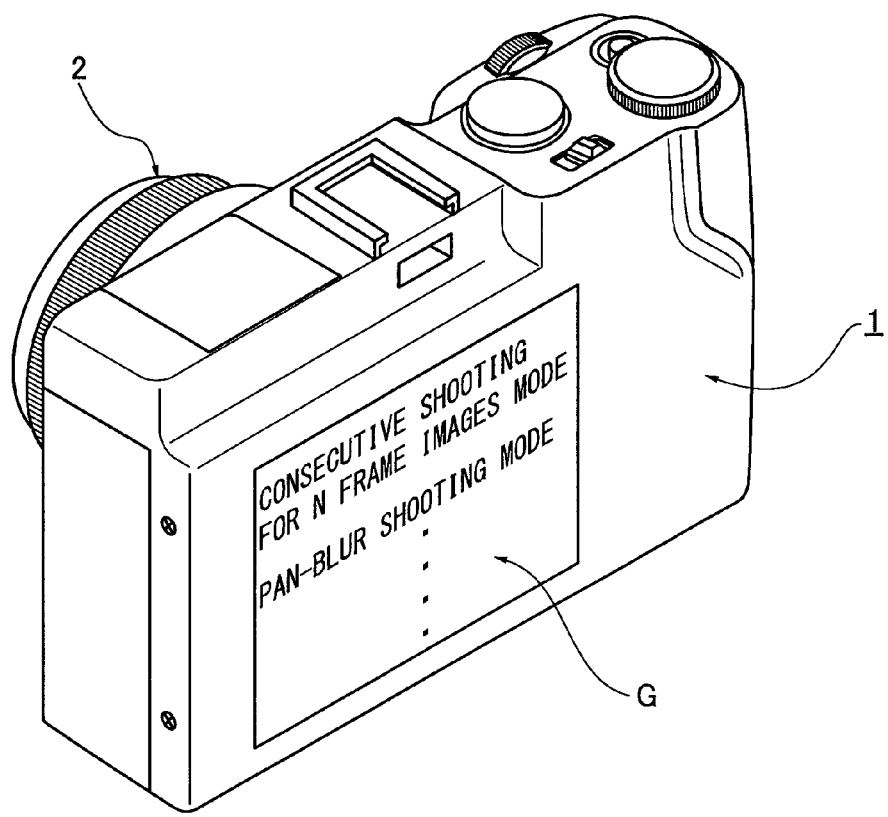
FIG. 2 is an external view of a digital camera using the pan-blur shooting according to an embodiment of the present invention.

FIG. 2 is a perspective diagram of the imaging apparatus to which the present invention is applied, and in FIG. 2, reference sign 1 denotes a camera body, and reference sign 2 denotes a lens barrel having a shooting optical system.

In the case of performing the pan-blur shooting, for example, a menu screen is displayed on a monitor screen G provided on the back of the camera body 1, a pan-blur shooting mode, and a consecutive shooting for N frame images mode are set.

Figure 3:
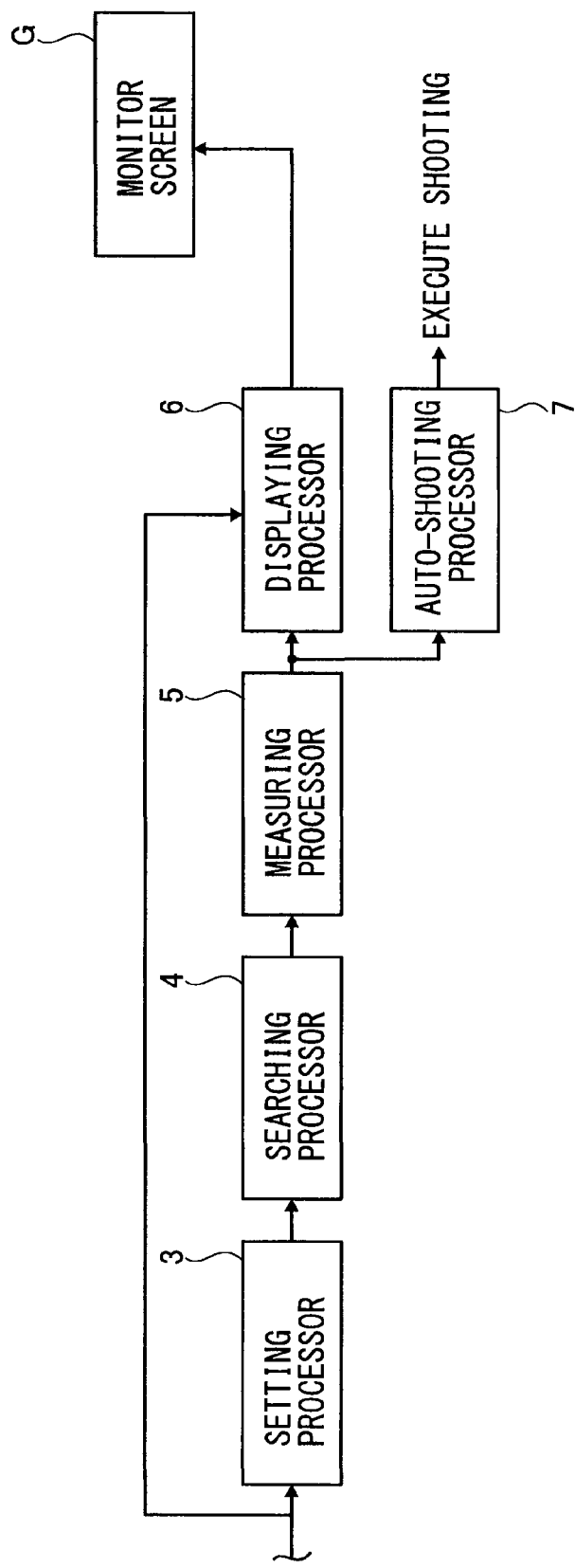
FIG. 3 is a block diagram illustrating a main constitution of each processor for the pan-blur shooting according to the embodiment of the present invention.

FIG. 3 is a block diagram illustrating each processor of image processing in the pan-blur shooting mode. In FIG. 3, reference sign 3 denotes a setting processor, reference sign 4 denotes a searching processor, reference sign 5 denotes a measuring processor, reference sign 6 denotes a displaying processor, reference sign 7 denotes an auto-shooting processor, and reference sign G denotes a monitor screen.

Frame image data obtained via the shooting optical system is displayed as a frame image on the monitor screen G by the displaying processor 6, and inputted to the setting processor 3.

Figure 4:
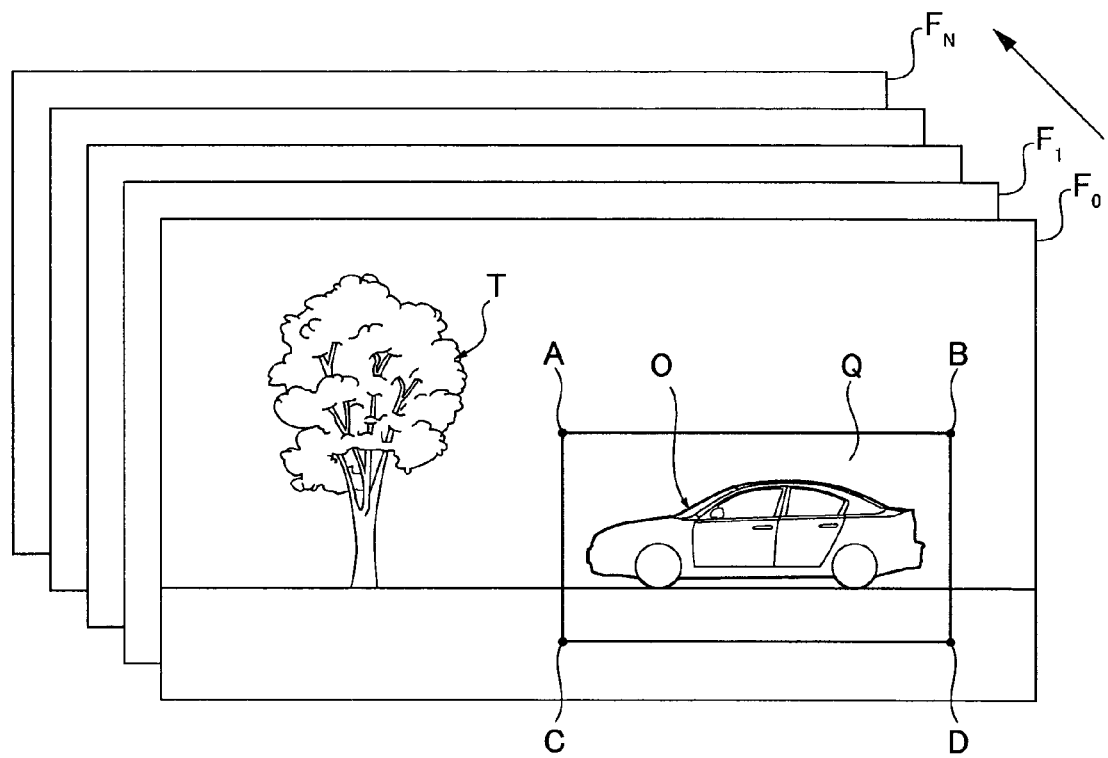
FIG. 4 is a schematic diagram illustrating an example of N frame images.

Here, in the setting processor 3, in the pan-blur shooting mode, as illustrated in FIG. 4, frame image data corresponding to frame images $F_0$ to $F_N$ of N frame images is inputted. In FIG. 4, photographic subject images T and O of the frame image $F_0$ have been illustrated as an example of a photographic subject image.

Figure 5:
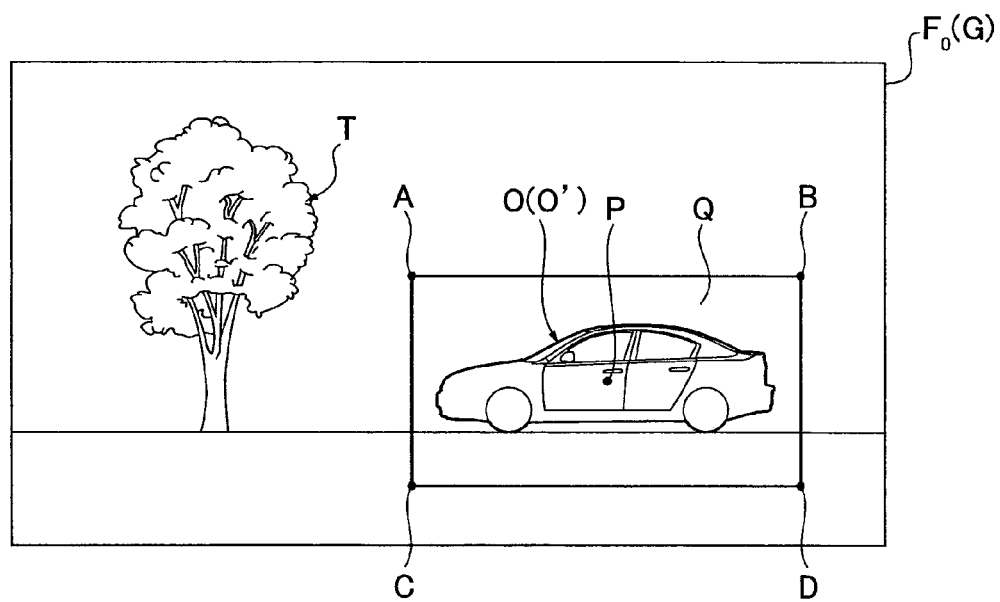
FIG. 5 is a frame image used for an explanation of setting of a tracking image area.

The setting processor 3, as illustrated in FIG. 5, sets an image area including a photographic subject image O which is a tracking shooting object in the pan-blur shooting as a tracking image area Q, based on the frame image data corresponding to the frame image $F_0$ obtained via the shooting optical system.

When the digital camera is aimed at a photographic subject, a photographic subject image O corresponding to a moving photographic subject moves and is displayed on the monitor screen G. In the case where the moving photographic subject is taken as a tracking shooting object in the pan-blur shooting, the photographic subject image O is taken as a tracking object image O', and the tracking object image O' is tracked.

In the setting processor 3, frame image data corresponding to the frame images $F_0$ to $F_N$ illustrated in FIG. 4 obtained serially via the shooting optical system is continuously inputted, and in real time, the photographic subject image O corresponding to the frame images $F_0$ to $F_N$ is continuously displayed for monitoring on the monitor screen G illustrated in FIGS. 2 and 3.

The following explanation will be explained by using the frame images $F_0$ to $F_N$, and the frame images $F_0$ to $F_N$ denote images displayed on the monitor screen G in real time.

A user sets an image area including the photographic subject image O which is the tracking shooting object in the pan-blur shooting from the photographic subject images T and O in the frame image $F_0$ displayed on the monitor screen G as the tracking image area Q.

For example, as for the frame image $F_0$ illustrated in FIG. 5 (image displayed on the monitor screen G), by touching each point A, B, C, and D (four points) on the monitor screen G by the user, a rectangular frame surrounded by each of the specified points A, B, C, and D is set as the tracking image area Q including the photographic subject image O by the setting processor 3.

Additionally, for example, on the monitor screen G illustrated in FIG. 5, by specifying a point P of the photographic subject image O, a rectangular frame in a predetermined size (a rectangular frame in which the point P is taken as an intersection point of a diagonal line) can be set by the setting processor 3, and the inside of the rectangular frame can be set as the tracking image area Q including the photographic subject image O.

Furthermore, in this case, an image area with a large difference of contrast can be automatically set as the tracking image area Q by the setting processor 3.

Figure 6A:
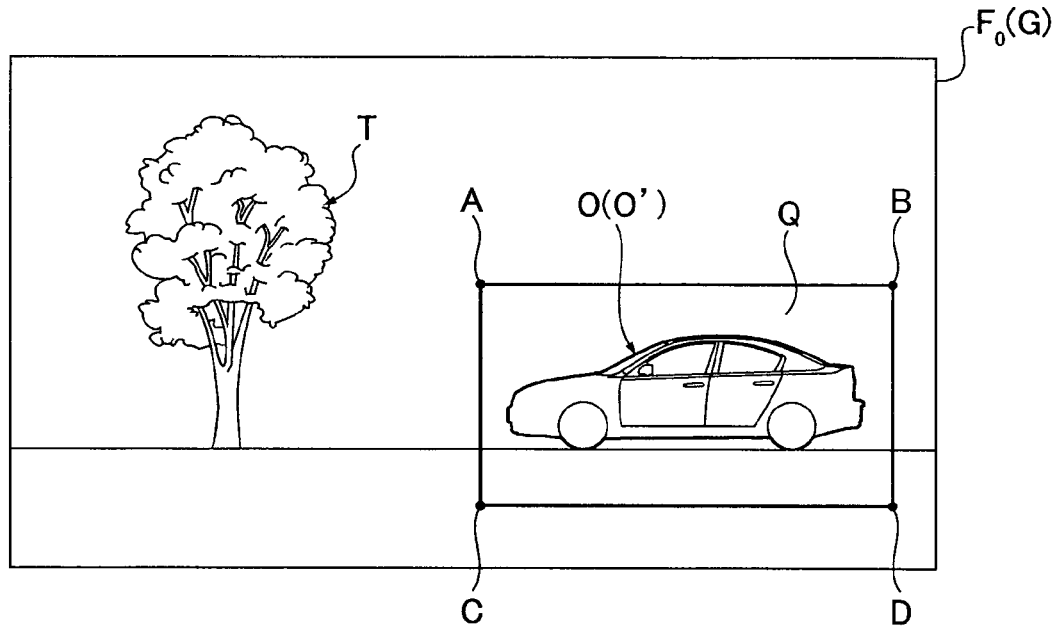
FIGS. 6A and 6B are schematic diagrams of a frame image illustrating a relationship among the tracking image area, a scanning area, and a tracking object existing area, where

The photographic subject image O existing in the tracking image area Q illustrated in FIG. 6A is taken as the tracking object image O'.

Figure 6B:
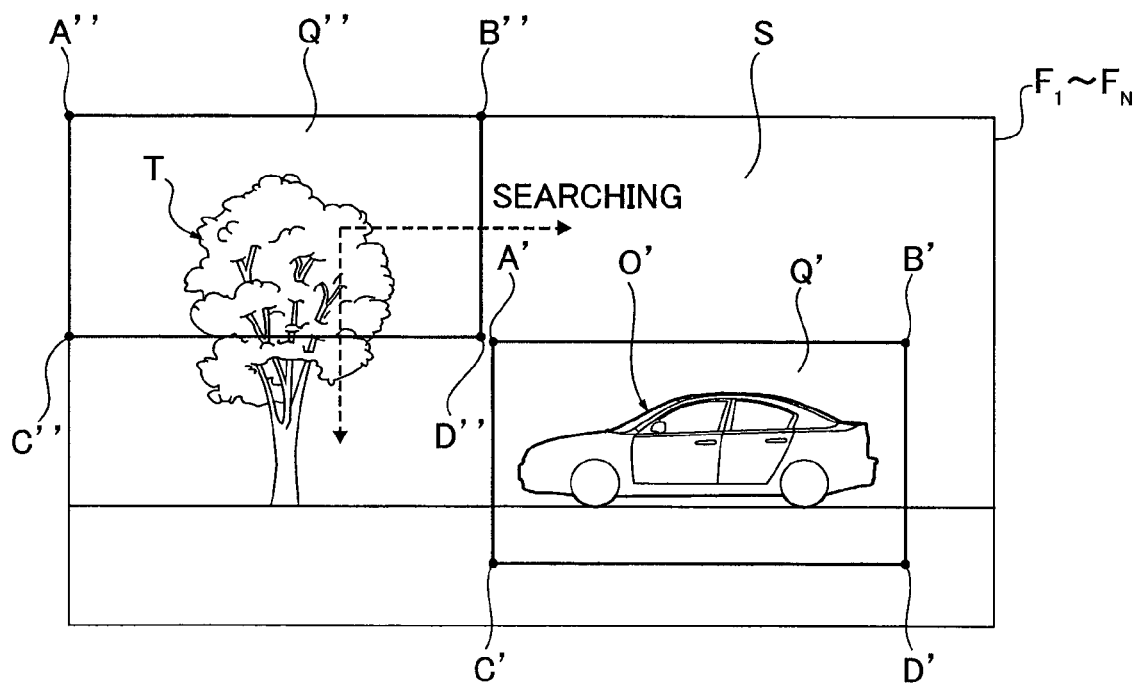

As illustrated in FIG. 6B, the searching processor 4 sets a scanning area Q" to compare with the tracking image area Q for each of the frame images $F_1$ to $F_N$ chronologically after the frame image $F_0$, and makes a comparison of a characteristic amount of an image between the tracking image area Q and the scanning area Q" of each of the frame images $F_1$ to $F_N$ chronologically after, so that the searching processor 4 determines whether the scanning area Q" is a tracking object existing area Q' including the tracking object image O' or not.

Thus, the searching processor 4 obtains the tracking object existing area Q' which is chronologically consecutive.

That is, the searching processor 4 takes the tracking image area Q set in the frame image $F_0$ as a template, and for example, in a searching area S of a next frame image $F_1$ to the frame image $F_0$ illustrated in FIG. 6A, by setting a scanning area Q" in each of the right direction and the down direction in a predetermined order and repeating making a comparison between the characteristic amount of the image existing in the tracking image area Q and a characteristic amount of an image existing in the scanning area Q", as illustrated in FIG. 6B, the searching processor 4 determines that the scanning area Q" in which similarity is highest to the image existing in the tracking image area Q is the tracking object existing area Q' including the tracking object image O'.

In FIG. 6B, each point of a rectangular frame surrounding the scanning area Q" corresponding to each point A, B, C, and D of the rectangular frame surrounding the tracking image area Q is marked as A", B", C" and D", and likewise, each point of a rectangular frame surrounding the tracking object existing area Q' is marked as A', B', C' and D'.

In this embodiment, the searching area S is an entire area of the frame image $F_1$, however it is not limited thereto.

Frame images $F_0$ to $F_N$ (N is a positive integer) are serially obtained at a time interval $\Delta t$, and with respect to each of the frame images $F_0$ to $F_N$ serially obtained, the tracking object existing area Q' is determined.

A frame image on which searching is performed is taken as a frame image $F_i$ (i is an integer which satisfies $1 \leq i \leq N$).

The measuring processor 5 divides a difference between a coordinate of the tracking object existing area Q' on the monitor screen G obtained with respect to a frame image $F_{i-1}$ and a coordinate of the tracking object existing area Q' on the monitor screen G obtained with respect to a frame image $F_1$, that is, a shift of the tracking object existing area Q', by an obtaining time interval $\Delta t$ of frame image, so that the measuring processor 5 measures a moving speed of the tracking object image O' on the monitor screen G.

Figure 7:
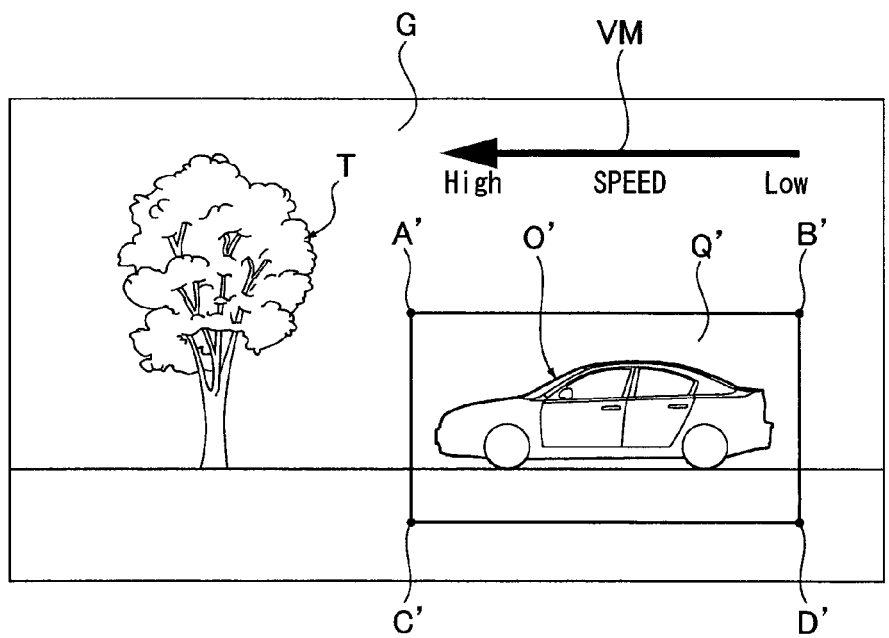
FIG. 7 is a diagram illustrating a speed display mark displayed on the monitor screen.

The displaying processor 6 performs displaying processing that displays an arrow as a speed display mark VM corresponding to the moving speed of the tracking object image O' obtained by the above measurement on the monitor screen G illustrated in FIG. 7.

For a calculation of similarity between the photographic subject image O existing in the tracking image area Q of the frame image $F_0$ and an image existing in the scanning area Q" of the frame image $F_1$, for example, a brightness histogram obtained by each pixel existing in the tracking image area Q and a brightness histogram obtained by each pixel existing in the scanning area Q" are used.

For example, the brightness histogram obtained by each pixel in the tracking image area Q is taken as $q=[q_1, q_2, \ldots, q_n]$. Each of the signs $q_1, q_2, \ldots, q_n$ is the number of pixels where the brightness level is "1", the number of pixels where the brightness level is "2", ..., the number of pixels where the brightness level is "n", respectively.

And, the brightness histogram obtained by each pixel in the scanning area Q" is taken as $p=[p_1, p_2, \ldots, p_n]$. Each of the signs $p_1, p_2, \ldots, p_n$ is the number of pixels where the brightness level is "1", the number of pixels where the brightness level is "2", ..., the number of pixels where the brightness level is "n", respectively.

When obtaining each brightness histogram, to minimize an influence of a variation of an area in the brightness histogram, normalization is performed on all pixels of each of the tracking image area Q and the scanning area Q".

Similarity Sim between the tracking image area Q and the scanning area Q" is obtained by formula 1 below.

$$Sim = \sum_{u=1}^{n} \sqrt{p_u * q_u} \quad \text{[formula 1]}$$

The scanning area Q" in which the similarity Sim is maximum is taken as the tracking object existing area Q' in the frame image $F_1$.

The searching processor 4 performs such processing to compare the brightness histograms and search for the scanning area Q" in which the similarity Sim is maximum on each of the frame images $F_1$ to $F_N$ at the time interval $\Delta t$.

Each time the tracking object existing area Q' is obtained, with respect to the tracking object existing area Q' obtained per frame image, the measuring processor 5 performs the calculation below, to obtain the moving speed of the tracking object image O' existing in the tracking object existing area Q' on the monitor screen G, based on a difference between the coordinate of the tracking object existing area Q' on the monitor screen G obtained from the frame image $F_{i-1}$ and the coordinate of the tracking object image existing area Q' on the monitor screen G obtained from the frame image $F_i$, that is, based on the shift of the tracking object existing area Q'.

For example, the following formulas 2 and 3 are used for the above calculation.

$$V_x = \frac{x' - x}{\Delta t} \quad \text{[formula 2]}$$

$$V_y = \frac{y' - y}{\Delta t} \quad \text{[formula 3]}$$

Here, $V_x$ is a speed in the horizontal direction on the monitor screen G, and $V_y$ is a speed in the vertical direction on the monitor screen G. Each of a coordinate (x', y') and a coordinate (x, y) is each of a coordinate on the frame image $F_0$ and a coordinate on the frame image $F_1$, which specifies a position of the tracking object existing area Q' on the monitor screen G. $\Delta t$ is an obtaining time interval of frame image.

Generally, the moving speed of the tracking object image O' on the monitor screen G is a value of a difference between the coordinate of the tracking object existing area Q' on the monitor screen G in the frame image F, and the coordinate of the tracking object existing area Q' on the monitor screen G in the frame image. $F_{i-1}$, that is, the shift of the tracking object existing area Q' is divided by the obtaining time interval Δt.

Based on the moving speed obtained by the measuring processor 5, the displaying processor 6 displays the arrow as the speed display mark VM on the monitor screen G as illustrated in FIG. 7. The speed display mark VM indicates that the longer a length of the arrow, the faster the moving speed of the tracking object image O' on the monitor screen G. That is, the moving speed of the tracking shooting object in the pan-blur shooting is fast.

The user moves the camera corresponding to a movement of the photographic subject so as to make the length of the arrow shorter, and thereby it is possible to track the photographic subject and perform a suitable pan-blur shooting.

The auto-shooting processor 7 determines a measurement result of the measuring processor 5. And when the moving speed of the tracking object existing area Q' on the monitor screen G, that is, the moving speed of the tracking object image O' becomes less than or equal to a predetermined threshold value, shooting is automatically executed, and a pan-blur shot image is obtained.

Hereinafter, a hardware constitution of a digital camera as an example of an imaging apparatus having those processors will be explained.

Figure 8:
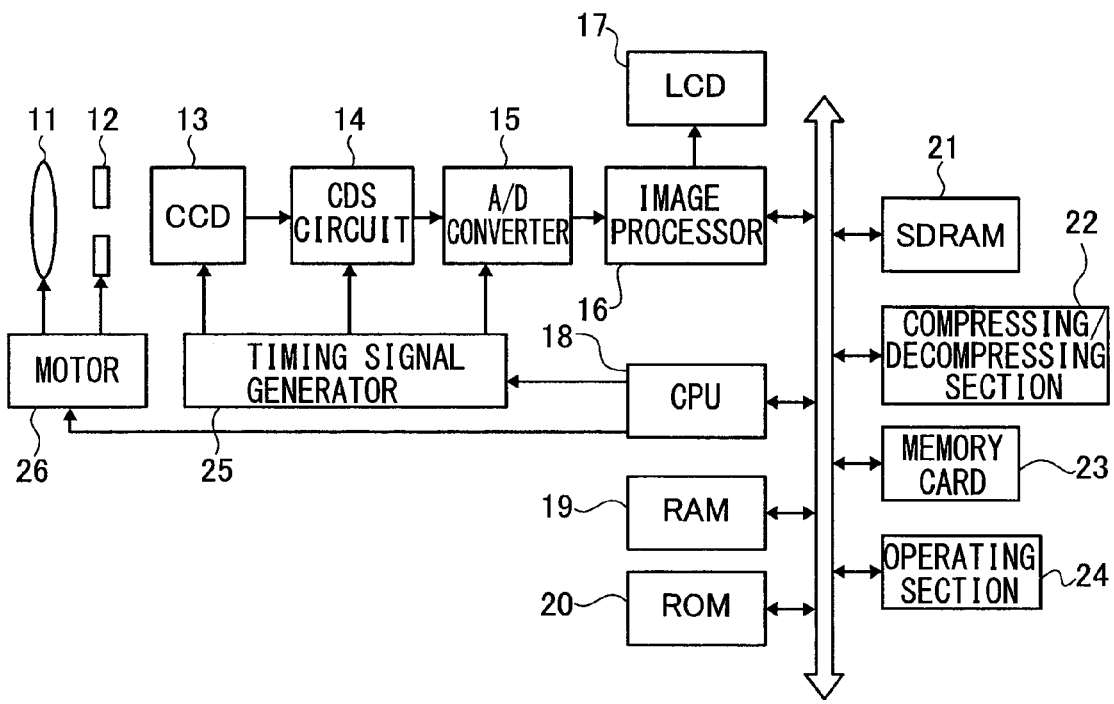
FIG. 8 is a block diagram of the digital camera illustrated in FIG. 2.

FIG. 8 is a block diagram illustrating the hardware constitution of the digital camera. The digital camera includes a shooting optical system 11, a mechanical shutter 12, a CCD (Charge-Coupled Device) 13, a CDS (Correlated Double Sampling) circuit 14, an A/D (Analog-Digital) converter 15, an image processor (image processing circuit) 16, a liquid crystal display (LCD) 17 having the monitor screen G, a CPU (Central Processing Unit) 18, a RAM (Random Access Memory) 19, a ROM (Read-Only Memory) 20, a SDRAM (Synchronous Dynamic Random Access Memory) 21, a compressing/decompressing section 22, a memory card 23, an operating section 24, a timing signal generator 25, and a motor 26.

Between the shooting optical system 11 and the CCD 13, the mechanical shutter 12 is disposed, and is used for blocking light from a photographic subject incident on the CCD 13. A focus lens and the like of the shooting optical system 11 and the mechanical shutter 12 are driven by the motor 26.

When the digital camera is aimed at a photographic subject, light from the photographic subject is inputted on the CCD 13 through the shooting optical system 11.

The CCD 13 converts image information of the light inputted through the optical system 11 to an analog image signal and outputs it. From the image signal outputted from the CCD 13, a noise component is removed by the CDS circuit 14, and then the A/D converter 15 converts to a digital signal, and the digital signal is inputted to the image processor 16.

The image processor 16 generates image data per image frame from the inputted digital signal. And the generated image data per image frame is temporarily stored in the SDRAM 21, and the image processor 16 performs various image processings such as YCrCb converting processing, white balance controlling processing, contrast compensating processing, edge enhancing processing, color converting processing, and the like on the stored image data.

In the white balance controlling processing, color depth of an image is adjusted, and in the contrast compensating processing, contrast of an image is adjusted. In the edge enhancing processing, sharpness of an image is adjusted, and in the color converting processing, color of an image is adjusted. Image data on which signal processing and image processing have been performed is displayed on the monitor screen G of the LCD 17 by the image processor 16.

The image data on which the signal processing and image processing have been performed is recorded via the compressing/decompressing section 22 on the memory card 23. In accordance with an instruction obtained from the operating section 24, the compressing/decompressing section 22 compresses the image data outputted from the image processor 16 and outputs it to the memory card 23, and decompresses the image data read from the memory card 23 and outputs it to the image processor 16.

Each timing of the CCD 13, the CDS circuit 14, and the A/D converter 15 is controlled by the CPU 18 via the timing signal generator 25, which generates a timing signal. The image processor 16, the compressing/decompressing section 22, and the memory card 23 are controlled overall by the CPU 18.

The CPU 18, the ROM 20, which is a read-only memory and in which the programs and the like are stored, and the RAM 19, which is a freely readable and writable memory having a work area used in the various processings, a storage area for various data, and the like, are connected to each other by a bus line. And the CPU 18 performs various arithmetic processings in accordance with programs.

An image processing program executed by this digital camera is a module constitution including a function of tracking a photographic subject and measuring a moving speed of the photographic subject on the monitor screen G.

In a case of executing the above image processing program, the CPU 18 loads the program in which processing steps of each of the processors illustrated in FIG. 3 have been written from the ROM 20 as a recording medium, and based on the program, executes calculation of the speed of the tracking object image O', executes controlling of display of the monitor screen G of the digital camera, performs image shooting and image processing, compresses images, and generates a pan-blur shot image data in the memory card 23.

Figure 9:
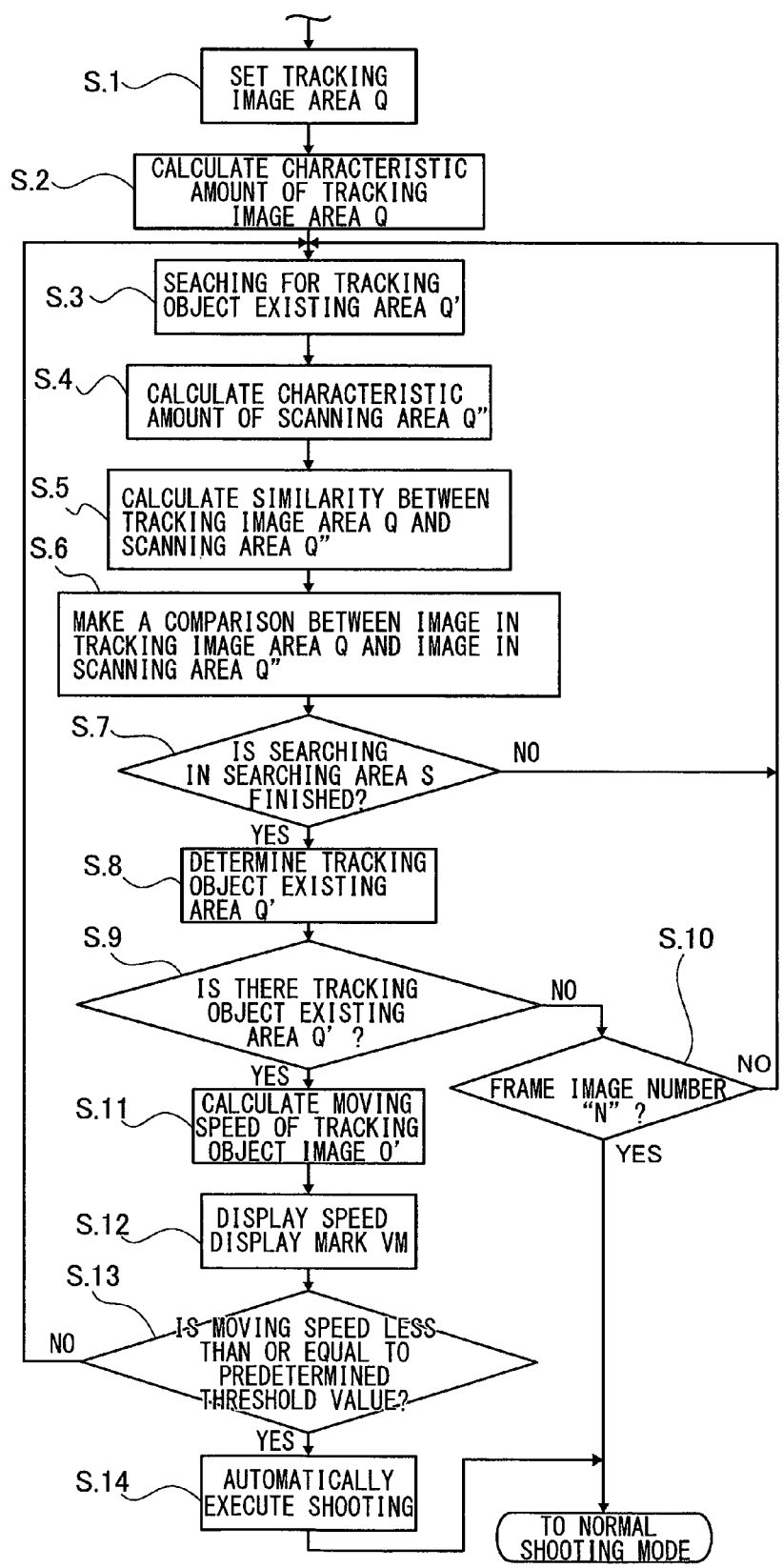
FIG. 9 is a flowchart illustrating processing steps of image processing according to the embodiment of the present invention.

Hereinafter, execution of the pan-blur shooting will be explained with reference to a flowchart illustrated in FIG. 9.

An image including a photographic subject image O which is moving is inputted to the image processor 16, and displayed on the monitor screen G of the LCD 17.

For example, when a user touches the monitor screen G while looking at the monitor screen G, a coordinate of a position on the monitor screen G where the user touched is inputted, and a tracking image area Q including the photographic subject image O which is a tracking shooting object in the pan-blur shooting is set (step S.1).

The CPU 18 firstly functions as the setting processor 3, and selects a high contrast area in the tracking image area Q in accordance with a tracking program, and sets the tracking image area Q as a tracking object existing area Q' including a tracking object image O'.

And then, a characteristic amount of an image in the tracking image area Q is calculated (step S.2).

The CPU 18 obtains a frame image corresponding to a frame image being displayed as a moving image in real time on the monitor screen G at a time interval Δt, and stores data of consecutive two frame images in the SDRAM 21.

The stored two frame images are taken as a frame image $F_i$ and a frame image $F_{i-1}$, and the CPU 18 uses those frame image data of the frame image $F_i$ and frame image data of the frame image $F_{i-1}$ for tracking processing.

Next, the CPU 18 functions as the searching processor 4, and sets a scanning area Q" for each of frame images $F_1$ to $F_N$ following a frame image $F_0$, and changes a position of the scanning area Q" in a searching area S, and executes searching for the tracking object existing area Q' (step S.3).

Each time the position of the scanning area Q'' is changed, the CPU 18 calculates a characteristic amount of an image in the scanning area Q'' (step S.4). And the CPU 18 executes a calculation of similarity between the characteristic amount of the image in the scanning area Q'' and a characteristic amount of an image in the tracking image area Q (step S.5), and makes a comparison between the image in the scanning area Q'' and the image in the tracking image area Q (step S.6). And until the searching in the searching area S is finished (step S.7), the CPU 18 performs searching processing of the steps S.3 to S.7, and if there is the scanning area Q'' where the similarity is highest, the CPU 18 determines that it is the tracking object existing area Q' (step S.8).

Next, with respect to a frame image $F_i$ on which the searching is being performed, the CPU 18 determines whether the tracking object existing area Q' is obtained or not (step S.9). When the tracking object existing area Q' is not obtained with respect to the frame image $F_i$, the CPU 18 determines whether the frame image $F_i$ is the Nth frame image or not (step S.10). And in the case where it is not the Nth frame image, the processing returns to the step S.3, and the CPU 18 performs the searching processing on a frame image $F_{i+1}$ where the searching is yet to be performed.

In the step S.10, in the case where it is the Nth frame image, execution of the pan-blur shooting mode is stopped, and it is returned to a normal shooting mode.

With respect to the frame image F, on which the searching is being performed, in the case where the tracking object existing area Q' is obtained, the CPU 18 functions as the measuring processor 5, and calculates a moving speed of the tracking object image O' on the monitor screen G based on frame image data of the tracking object existing area Q' obtained with respect to the frame image $F_{i-1}$ and frame image data of the tracking object existing area Q' obtained with respect to the frame image F, (step S.11).

The CPU 18 outputs display data based on a result of the moving speed on the LCD 17. Thus, on the monitor screen G, with the tracking object existing area Q', a speed display mark VM corresponding to the moving speed of the tracking object image O' on the monitor screen G is displayed (step S.12).

The user, in accordance with an arrow of the speed display mark VM, moves the camera body 1 in the direction where the arrow indicates. If a length of the arrow becomes shorter, a moving speed of the camera body 1 becomes closer to the moving speed of the tracking object image O', and thus, it is possible for the user to recognize that the moving speed of the camera body 1 becomes closer to a moving speed of the photographic subject.

The CPU 18 determines whether the moving speed of the tracking object image O' in the tracking object existing area Q' on the monitor screen G is less than or equal to a predetermined threshold value (step S.13), and in a case where the moving speed is less than or equal to the predetermined threshold value, the shooting is automatically performed (step S.14). Accordingly, a suitable pan-blur shot image is obtained. And then, it is returned to the normal shooting mode.

In the case where the moving speed of the tracking object image O' in the tracking object existing area Q' on the monitor screen G is not less than or equal to the predetermined threshold value, the processing returns to the step S.3, and the CPU 18 repeatedly performs processing after the step S.3, and when the processing is finished with respect to the N frame images, the CPU 18 stops the pan-blur shooting, and it is returned to the normal shooting mode.

In the pan-blur shooting, one pan-blur shot image can be taken in a single shooting mode, and a plurality of pan-blur shot images can be taken in a consecutive shooting mode.

On image data obtained by the above pan-blur shooting, the signal processing and the image processing are performed, and then predetermined processing by the compressing/decompressing section 22 are performed, and it is recorded in the memory card 23.

Figure 10:
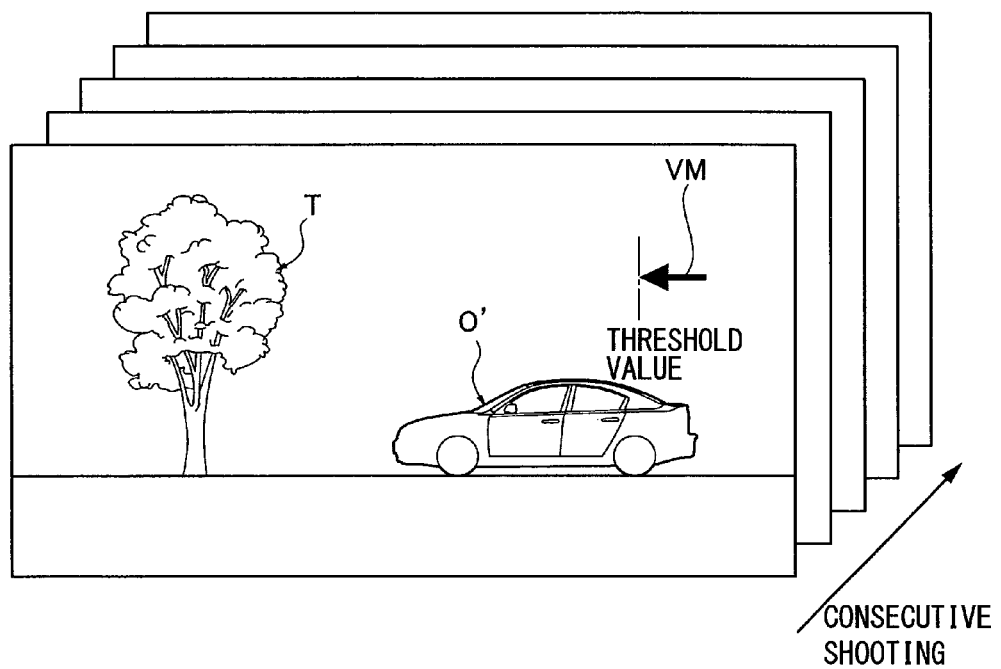
FIG. 10 is a diagram illustrating a frame image obtained by the pan-blur shooting.

For example, in the consecutive shooting mode, as illustrated in FIG. 10, when the length of the arrow of the speed display mark VM becomes less than or equal to a predetermined threshold value, a shutter is released, and the consecutive shooting is performed. And when the length of the arrow of the speed display mark VM becomes equal to or more than the predetermined threshold value, the consecutive shooting is stopped. Thus, a plurality of a series of pan-blur shot images are obtained. The user can choose a suitable pan-blur shot image of the plurality of the series of pan-blur shot images. Accordingly, it is possible for the user to reliably obtain a suitable pan-blur shot image.

In the case where the moving speed of the tracking object image O' of the tracking object existing area Q' becomes less than or equal to the predetermined threshold value, the pan-blur shooting can be performed such that an exposure time is set longer than an exposure time obtained by a light metering calculation and the shutter of the camera is released.

And accordingly, it is possible to greatly enhance an effect of the pan-blur shot image. The longer the exposure time becomes, the more a blurring effect that an object image existing in the background flows is enhanced.

Furthermore, if the moving speed of the tracking object existing area Q' becomes less than or equal to the predetermined threshold value, a consecutive pan-blur shooting can be executed while changing an exposure time of each frame image data between a shorter exposure time than the exposure time obtained by the light metering calculation and a longer exposure time.

When the above-described consecutive pan-blur shooting is executed, a plurality of pan-blur shot images having different effects are obtained, while changing the exposure time with respect to each of the frame images $F_1$ to $F_N$.

The longer the exposure time of a series of pan-blur shot images taken consecutively is, the more the blurring effect that the background flows is enhanced According to an embodiment of the present invention, since shooting is automatically performed when a moving speed of a tracking object image obtained by a measuring processer is less than or equal to a predetermined threshold value, it is possible to reliably perform a pan-blur shooting.

Moreover, in this case, a plurality of pan-blur shot images are consecutively taken, therefore it is possible to choose a desired shot image of pan-blur shot images later on.

Furthermore, since a shooting exposure time is set long and shooting is performed, it is possible to enhance a shooting effect of a pan-blur shot image.

According to an embodiment of the present invention, since a plurality of pan-blur shooting shot images are consecutively obtained while changing a shooting exposure time, it is possible to obtain a plurality of pan-blurring shot images having different shooting effects at a time.

In a case where a brightness histogram obtained with respect to each area is used as a characteristic amount of an image, it is possible to use an existing image processing technique on the brightness histogram.

According to an embodiment of the present invention, it is possible to easily and reliably perform a pan-blur shooting, even though a user is not a professional photographer with a high shooting skill.

Although the present invention has been described in terms of exemplary embodiments, it is not limited hereto. It should be appreciated that variations may be made in the embodiments described by persons skilled in the art without departing from the scope of the present invention as defined by the following claims.

CROSS REFERENCE TO RELATED APPLICATION

The present application is based on and claims priority from Japanese patent application number 2010-111748, filed May 14, 2010, the disclosure of which is hereby incorporated by reference herein its entirety.

The invention claimed is:

1. An imaging apparatus comprising:
   a setting processor which sets an image area including a tracking shooting object image in a pan-blur shooting as a tracking object image as a tracking image area, with respect to a specific frame image obtained at a certain time interval via a shooting optical system and consecutively displayed on a monitor screen;
   a searching processor which respectively sets a scanning area to compare with the tracking image area for a plurality of frame images following the frame image used to set the tracking image area, and respectively moves the scanning area on each corresponding frame image of the plurality of frame images, and makes a comparison of a characteristic amount of an image between the tracking image area and the scanning area, so that the searching processor respectively obtains a scanning area where the characteristic amount of the image is similar to the image in the tracking image area as a tracking object existing area including the tracking object image, with respect to the plurality of frame images;
   a measuring processor which divides a difference between a coordinate of the tracking object existing area obtained with respect to one frame image of the plurality of frame images and that obtained with respect to a next frame image to the one frame image by the certain time interval, so that the measuring processor measures a moving speed of the tracking object image on the monitor screen; and
   a displaying processor which displays a speed display mark corresponding to the moving speed of the tracking object image on the monitor screen.

2. The imaging apparatus according to claim 1, comprising an auto-shooting processor which automatically executes shooting when the moving speed of the tracking object image obtained by the measuring processor is less than or equal to a predetermined threshold value.

3. The imaging apparatus according to claim 2, wherein the auto-shooting processor obtains a plurality of pan-blur shot images by consecutive shooting.

4. The imaging apparatus according to claim 2, wherein the auto-shooting processor sets an exposure time when shooting longer than an appropriate exposure time and executes shooting when the moving speed of the tracking object image is less than or equal to the predetermined threshold value.

5. The imaging apparatus according to claim 3, wherein the auto-shooting processor obtains the plurality of pan-blur shot images by consecutive shooting while changing a shooting exposure time.

6. The imaging apparatus according to claim 1, wherein the characteristic amount of the image is a brightness histogram obtained by each pixel in each area.

7. An image processing method comprising:
   a setting processing step which sets an image area including a tracking shooting object image in a pan-blur shooting as a tracking object image as a tracking image area, with respect to a specific frame image obtained at a certain time interval via a shooting optical system and consecutively displayed on a monitor screen;
   a searching processing step which respectively sets a scanning area to compare with the tracking image area for a plurality of frame images following the frame image used to set the tracking image area, and respectively moves the scanning area on each corresponding frame image of the plurality of frame images, and makes a comparison of a characteristic amount of an image between the tracking image area and the scanning area, so that the searching processing step respectively obtains a scanning area where the characteristic amount of the image is similar to the image in the tracking image area as a tracking object existing area including the tracking object image, with respect to the plurality of frame images;
   a measuring processing step which divides a difference between a coordinate of the tracking object existing area obtained with respect to one frame image of the plurality of frame images and that obtained with respect to a next frame image to the one frame image by the certain time interval, so that the measuring processing step measures a moving speed of the tracking object image on the monitor screen; and
   a displaying processing step which displays a speed display mark corresponding to the moving speed of the tracking object image on the monitor screen.

8. The image processing method according to claim 7, comprising an auto-shooting processing step which automatically executes shooting when the moving speed of the tracking object image obtained by the measuring processing step is less than or equal to a predetermined threshold value.

9. The image processing method according to claim 8, wherein the auto-shooting processing step obtains a plurality of pan-blur shot images by consecutive shooting.

10. The image processing method according to claim 8, wherein the auto-shooting processing step sets an exposure time when shooting longer than an appropriate exposure time and executes shooting when the moving speed of the tracking object image is less than or equal to the predetermined threshold value.

11. The image processing method according to claim 9, wherein the auto-shooting processing step obtains the plurality of pan-blur shot images by consecutive shooting while changing a shooting exposure time.

12. A computer-readable recording medium for recording thereon a computer program capable of being executed comprising:
   a setting processing step which sets an image area including a tracking shooting object image in a pan-blur shooting as a tracking object image as a tracking image area, with respect to a specific frame image obtained at a certain time interval via a shooting optical system and consecutively displayed on a monitor screen;
   a searching processing step which respectively sets a scanning area to compare with the tracking image area for a plurality of frame images following the frame image used to set the tracking image area, and respectively moves the scanning area on each corresponding frame image of the plurality of frame images, and makes a comparison of a characteristic amount of an image between the tracking image area and the scanning area, so that the searching processing step respectively obtains a scanning area where the characteristic amount of the image is similar to the image in the tracking image area as a tracking object existing area including the tracking object image, with respect to the plurality of frame images;

a measuring processing step which divides a difference between a coordinate of the tracking object existing area obtained with respect to one frame image of the plurality of frame images and that obtained with respect to a next one to the one frame image by the certain time interval, so that the measuring processing step measures a moving speed of the tracking object image on the monitor screen; and a displaying processing step which displays a speed display mark corresponding to the moving speed of the tracking object image on the monitor screen.

* * * * *